United States Patent [19]

Audureau et al.

[11] Patent Number: 4,624,823
[45] Date of Patent: Nov. 25, 1986

[54] BLOWN TUBING METHOD AND APPARATUS

[75] Inventors: Joël Audureau, Noeux les Mines; Michel R. Caron, Lille; Vincent Hervais, Bully-les-Mines, all of France

[73] Assignee: Societe Chimique des Charbonnages S.A., Paris, France

[21] Appl. No.: 625,896

[22] Filed: Jun. 29, 1984

[30] Foreign Application Priority Data

Jun. 29, 1983 [FR] France ............................... 83 10721
May 24, 1984 [FR] France ............................... 84 08123

[51] Int. Cl.$^4$ ............................................. B29C 49/04
[52] U.S. Cl. ...................................... 264/569; 264/565; 264/566; 425/72 R; 425/326.1
[58] Field of Search ............... 264/569, 566, 565, 564, 264/563; 425/72 R, 326.1

[56] References Cited

U.S. PATENT DOCUMENTS

| | | | |
|---|---|---|---|
| 4,080,143 | 3/1978 | Upmeier .......................... | 425/72 R |
| 4,115,048 | 9/1978 | Alderfer et al. .................. | 425/72 R |
| 4,472,343 | 9/1984 | Kawamura et al. ............... | 264/565 |

FOREIGN PATENT DOCUMENTS

| | | |
|---|---|---|
| EPA0006185 | 1/1980 | European Pat. Off. . |
| 0041803 | 12/1981 | European Pat. Off. . |
| 0077661 | 4/1983 | European Pat. Off. . |
| 2256942 | 5/1974 | Fed. Rep. of Germany . |
| 53-008339 | 3/1978 | Japan . |
| 56-037122 | 4/1981 | Japan . |
| 56-37123 | 4/1981 | Japan . |
| 594490 | 1/1978 | Switzerland . |

Primary Examiner—Donald Czaja
Assistant Examiner—Mary Lynn Fertig
Attorney, Agent, or Firm—Finnegan, Henderson, Farabow, Garrett & Dunner

[57] ABSTRACT

Apparatus for cooling plastic film or sheet obtained by blowing tubing, comprising at its intermediate section an intensive blowing ring for directing air towards the tubing and at its upper section an upper chamber in which the tubing is in contact with an air flow directed in the drawing direction of the tubing. At the lower section of the apparatus is a non-closed lower chamber provided with at least one opening. The apparatus can be used to form blown films having superior optical properties, particularly clarity and turbidity, from a large number of resins.

22 Claims, 2 Drawing Figures

BLOWN TUBING METHOD AND APPARATUS

BACKGROUND OF THE INVENTION

The present invention relates to a cooling apparatus and a process of manufacture of plastic film or sheet obtained by blowing tubing.

An apparatus is already known which is intended to produce blown tubular film or sheet of good clarity and which is constituted by an assembly of three juxtaposed elements: following the path of the tubing, this includes a closed chamber, for reheating, at the lowermost section of the apparatus, then in its intermediate section an intensive blowing ring, the air flow of which is directed perpendicularly to the tubing, this ring having the function of accelerating the solidification of the material, and finally in its upper section an upper chamber in which the tubing is in contact with an air flow directed in the drawing direction of the tubing.

Such an apparatus has already been described in the European Patent Application published under the number 0 041 803. This apparatus enables polyethylene sheets to be extruded at an expansion ratio equal to 2. However, it has the disadvantage of not permitting satisfactory extrusion of polyethylene sheets at an expansion ratio greater than 2, as is demonstrated in the comparative examples below. Besides this, such an apparatus has the disadvantage of only being able to improve the optical properties of the tubing for resins such as free-radical low density polyethylene, ethylene/vinyl acetate copolymer, and linear low density polyethylene, the optical properties of which were already relatively satisfactory. By satisfactory optical properties for application to the manufacture of tubing is meant a turbidity (determined according to ASTM D 103–77) not greater than 7%. Finally, a last disadvantage of this apparatus resides in the impossibility of improving the optical properties of the tubing (with respect to a conventional cooling system) while insuring a high throughput of material.

SUMMARY OF THE INVENTION

An object of the present invention is to permit more effective cooling when this is found to be necessary and thus to permit blown tubing to be obtained having good optical properties, in particular clarity and turbidity, at a considerable throughput and for a large number of resins.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the apparatus for cooling plastic film or sheet obtained by blowing tubing according to the invention, disposed above an annular extrusion die, comprises at its intermediate section an intensive blowing ring for directing air flow towards the tubing, this ring having the function of accelerating the solidification of the material; at its upper section, an upper chamber including means for directing air flow in the drawing direction of the tubing and in which the tubing is in contact with the air flow directed in the drawing direction of the tubing; and at its lower section a non-closed lower chamber provided with at least one opening.

Further to achieve the foregoing objects and in accordance with the purpose of the invention, as broadly described herein, the process of the invention for manufacturing plastic film or sheet by blowing tubing comprises extrusion-blowing of molten plastic material coming from an extrusion die, and cooling the resulting blown tubing by passing the tubing through an apparatus according to the invention. The ratio of the throughput of air aspirated into the lower chamber to the throughput of air introduced into the blowing ring preferably is between 0.1 and 0.5.

The accompanying drawings, which are incorporated in and constitute a part of this specification, illustrate the method and apparatus of the invention and, together with the description, serve to explain the principles of the invention.

DESCRIPTION OF THE PREFERRED EMBODIMENTS

Figure 1:
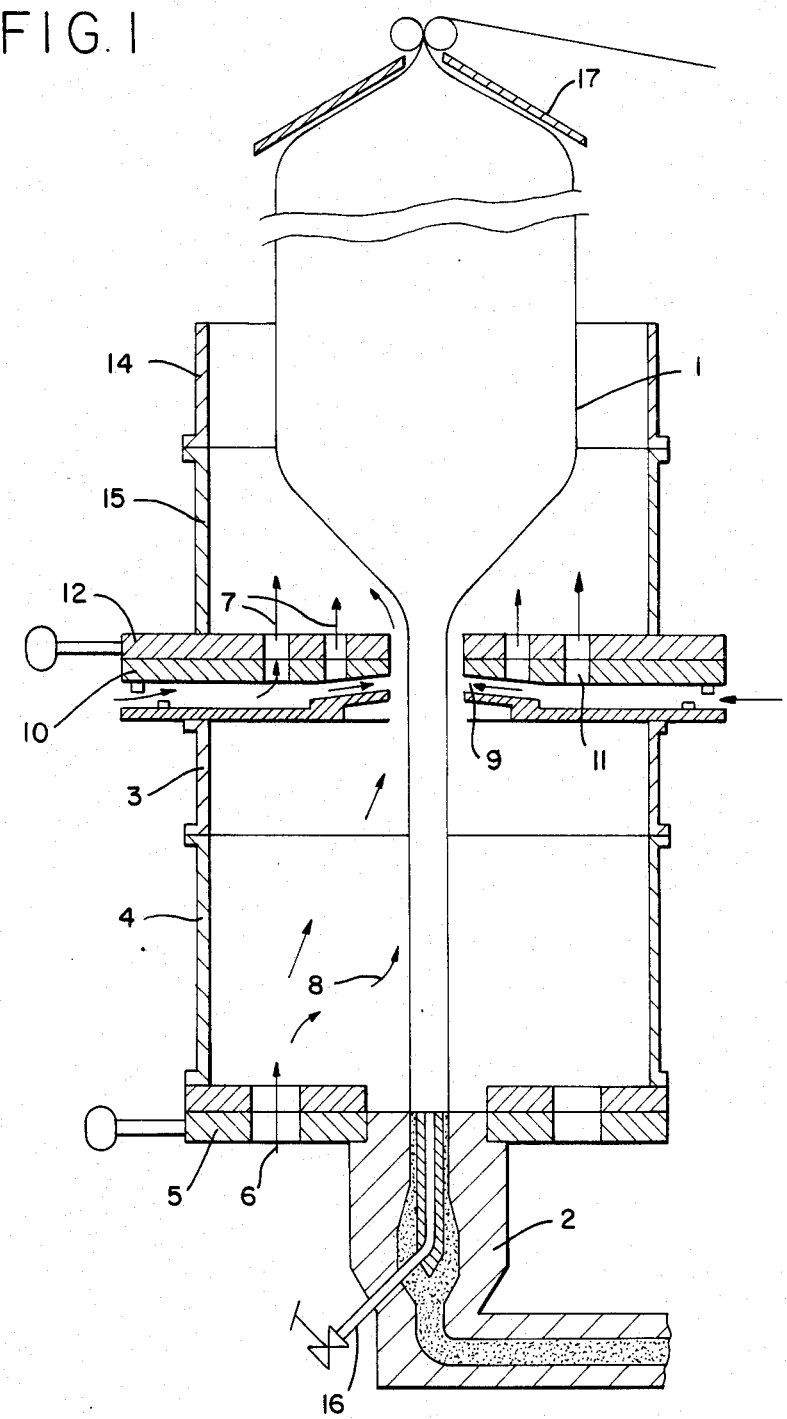
FIG. 1 is a sectional view of one embodiment in accordance with the present invention.

Reference will now be made in detail to the presently preferred embodiments of the invention, examples of which are illustrated in the accompanying drawings.

Each opening of the non-closed chamber can be adjustable by means of a system constituted, for example, by perforated discs. Furthermore, the lower, non-closed chamber can have an adjustable height, advantageously obtained by a series of nestable elements of different heights. In the same way, the upper chamber can have an adjustable height, advantageously obtained by a series of nestable elements of different heights. The apparatus can furthermore comprise means permitting modification of the throughput of the air flow directed, at the level of the upper chamber, in the drawing direction of the tubing.

The intensive blowing ring is advantageously constituted such that the angle A defined between the axis perpendicular to the tubing and the direction of the air flow leaving the ring is comprised between 0° and 85°.

According to an embodiment of the invention, the apparatus can furthermore comprise an internal cooling system comprising at least one air supply channel and at least one discharge channel for pulsed air passing axially through the annular extrusion die. For example, the cooling system can comprise an axial input channel of the annular extrusion die, at the center of which channel is disposed an air exit channel, in order to cool the internal part of the tubing.

This system of internal cooling can furthermore be adjustable in height by means of at least one nestable element. This nestable element can comprise at least one airtight part and/or at least one part having openings to allow a flow of air to escape, this flow having the function of cooling the interior or the tubing after leaving the extrusion die and even before it is in contact with the air flows leaving the internal cooling system proper.

According to another embodiment of the invention, the intensity of the air flow coming from the intensive blowing ring can be modified by changing the width F of the blowing lip of this ring between 0.1 and 15 mm.

By "blowing lip" is meant the edges of the opening permitting the passage of the air flow leaving the intensive blowing ring towards the tubing.

The elements numbered 1–15 in the two Figures of the drawings are common to both embodiments illustrated in the drawings.

In the first embodiment, shown in FIG. 1, the tubing of material 1 is obtained from molten material coming from the annular extrusion die 2; following the path of the material from the extrusion die, the tubing is first moderately cooled in the lower chamber preferably constituted by at least two nestable elements 3 and 4, this chamber comprising at its lower part a system of adjustable openings 5 permitting the admission of air 6 aspirated due to the reduced pressure produced by the air flow 7 projected into the upper chamber constituted by the elements 14 and 15; in this first section the tubing is moderately cooled by the air stream 8 and does not undergo appreciable dimensional modifications. The tubing is then violently cooled by means of air jet 9 leaving the blowing ring 10, the direction of this jet being substantially perpendicular to the tubing 1. After leaving the blowing ring 10, the tubing arrives in the upper chamber, preferably constituted by at least two nestable elements 14 and 15, in which there exists an air flow permitting air to leave following the flows 7 in the upper chamber constituted by the elements 14 and 15 in the drawing direction of the tubing 1, the throughput of the air flows 7 being modifiable by means of the adjustment system 12. It is in this upper chamber that the tubing takes its final dimension under the action of the excess pressure of air which is present within the latter, the excess-pressure air being introduced by the pressurizing tube 16. Finally the tubing is definitively solidified and drawn by means of the drive system 17.

Figure 2:
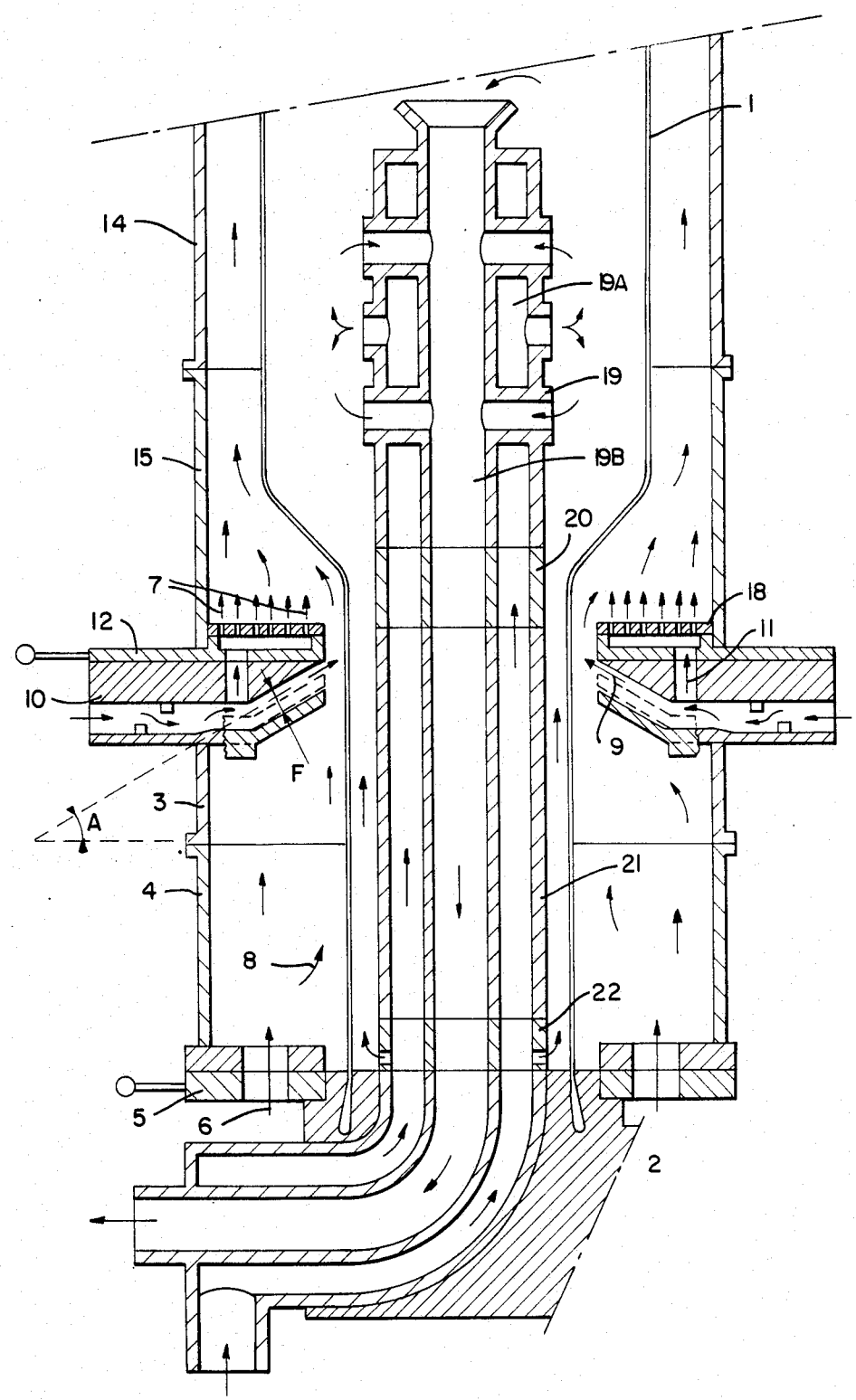
FIG. 2 is a sectional view of another embodiment in accordance with the present invention.

In the second embodiment, shown in FIG. 2, air jets 9 leaving the blowing ring 10 can be regulated in both direction and intensity:

in direction, by using a set of different blowing rings 10, each having a different blowing angle A; this angle A can be modified between 0° and 85°.

in intensity, by modification of the opening F of the blowing lip, mounted on the blowing ring 10. Obviously, this modification brings about a change in the ratio of the air flow 9 blown towards the tubing to the air flow 11 projected into the upper chamber.

Perturbations of the air flow 7 are reduced by providing, for example, a perforated grid 18, disposed in the air exit adjustment system 12. The excess-pressure air is introduced into the upper chamber by a cooling system 19 placed within the tubing 1 and adjustable in height by means of nestable elements 20, 21, and 22, the element 22 being provided with openings in order to permit an air flow escape just after the exit from the extrusion die. This cooling system comprises an air supply channel 19A and an air discharge channel 19B.

Finally, the tubing is definitively solidified and drawn by means of a drive system 17 (not shown) of the same type as that shown previously for the first embodiment.

In accordance with the invention, as embodied herein, the invention further comprises a process of manufacture of plastic sheets by blowing tubing, comprising on the one hand a step of extrusion-blowing of molten plastic material coming from an extrusion die and on the other hand a step of cooling of the blown tubing thus obtained, characterized in that the step of cooling is effected by passage of the tubing through an apparatus of the type previously described. In particular, it is advantageous for the ratio of the throughput of air aspirated into the lower chamber to the throughput of air introduced into the blowing ring to be comprised between 0.1 and 0.5.

The process according to the invention has the advantages of obtaining films with good properties (clarity, turbidity) from resins such as free-radical polyethylene, high density polyethylene, polypropylene, polybutene-1, linear low density polyethylene, and mixtures of these, haveing a melt flow index (determined according to ASTM D 1238/73) comprised between 0.1 and 10 dg/min. In particular, the process according to the invention enables films with good optical properties to be manufactured, starting from free-radical polyethylene of melt flow index greater than 3 dg/min, whereas this resin has previously been restricted to the manufacture of articles by molding methods other than extrusion-blowing. Furthermore, this process likewise enables films to be obtained at throughputs and/or expansion ratios which are considerably greater than those permitted by the process of the European Patent Application No. 0 041 803.

For the purpose of enabling the advantages of this process to be better understood in relation to the prior art, the following examples are given by way of illustration and are not limitative.

EXAMPLES 1–4

Films 40 microns thick are manufactured by extrusion-blowing of molten plastic material coming from a 30 mm diameter extrusion die, then cooling by the apparatus described above and shown in FIG. 1. The characteristics of the die and of the cooling apparatus are as follows:

die diameter 50 mm, gap width 0.5 mm.

cooling apparatus: height of lower chamber, 250 mm; height of upper chamber, 250 mm.

The ratio R of the throughput of air aspirated into the lower chamber to the throughput of air introduced into the blowing ring is indicated in Table I below. The expansion ratio TG (ratio of the diameter of the tubing to that of the extrusion die), and the throughput of material Q (expressed in kg/hour) are also indicated in Table I below.

The material utilized is a low density free-radical polyethylene marketed under the trademark LOTRENE FA 0401 (made by CdF Chimie) and having a melt flow index of 4 dg/min (measured according to ASTM D 1238-73) and a density of 0.918.

There are furthermore shown in Table I below:

the extrudability, noted as (+) when the blown tubing is free from optical defects such as streaks, and noted as (−) when the blown tubing has such optical defects; and the results of measurements of clarity (C), expressed in % and determined according to ASTM D 1746-78.

TABLE I

| Example | Q | TG | R | E | C |
|---|---|---|---|---|---|
| 1 | 3 | 2 | 0.47 | + | 46 |
| 2 | 6.9 | 2 | 0.49 | + | 41 |
| 3 | 4.1 | 3.2 | 0.13 | + | 62 |
| 4 | 6.9 | 3.2 | 0.15 | + | 49 |

COMPARATIVE EXAMPLES 1A–4A

Films of 40 microns thickness are manufactured by extrusion-blowing the same material as that used in Examples 1-4 above and on the same extruder as that of the Examples 1-4, then cooling by means of an apparatus of the type described in European Patent Application No. 0 041 803. In Table II below are reported, on the one hand, the operating conditions such as Q, TG and R, and on the other hand, the results for the properties of the blown tubing.

TABLE II

| Example | Q   | TG  | R | E | C  |
|---------|-----|-----|---|---|----|
| 1A      | 3   | 2   | 0 | — | 38 |
| 2A      | 6.9 | 2   | 0 | — | 36 |
| 3A      | 4.1 | 3.2 | 0 | — | 61 |
| 4A      | 6.9 | 3.2 | 0 | — | 41 |

EXAMPLES 5-8

The material used is low density free-radical polyethylene marketed under the trademark LOTRENE FB 5026 (made by CdF Chimie), having a melt flow index of 0.6 dg/min (measured according to ASTM D 1238-73) and a density of 0.921. In Table III below are reported the operating conditions such as Q, TG, and R, and also the results obtained on the blown tubing of 40 microns thickness, the latter having been obtained by means of the same apparatus as that of Examples 1-4.

TABLE III

| Example | Q   | TG  | R    | E | C  |
|---------|-----|-----|------|---|----|
| 5       | 3   | 2   | 0.14 | + | 16 |
| 6       | 6.8 | 2   | 0.18 | + | 16 |
| 7       | 3   | 3.2 | 0.26 | + | 21 |
| 8       | 6.8 | 3.2 | 0.11 | + | 20 |

COMPARATIVE EXAMPLES 5A-8A

Blown tubing of 40 microns thickness is manufactured by extrusion-blowing the same plastic material as that utilized in Examples 5-8, and by means of the same apparatus as that utilized in Examples 1A-4A. The operating conditions, and also the results obtained, are reproduced in Table IV below, in which an extrudability noted as (0) indicates that it is impossible to obtain blown tubing.

TABLE IV

| Example | Q   | TG  | R | E | C  |
|---------|-----|-----|---|---|----|
| 5A      | 3   | 2   | 0 | — | 11 |
| 6A      | 6.8 | 2   | 0 | — | 11 |
| 7A      | 3   | 3.2 | 0 | 0 | —  |
| 8A      | 6.8 | 3.2 | 0 | — | 20 |

COMPARATIVE EXAMPLES 9 and 9A

In Table V below are reported the results obtained on linear low density polyethylene marketed under the trademark LOTREX FW 1290 (made by CdF Chimie), having a melt flow index of 1 dg/min and a density of 0.919. The material throughput equals 3 kg/h and the expansion ratio is 2. In Example 9, the cooling system is the apparatus described in FIG. 1; in Example 9A, it is of the kind described in European Patent Application No. 0 041 803. T denotes the turbidity expressed in % and determined according to ASTM D 103-77. The extruder used is the same as that of Examples 1-8.

TABLE V

| Example | E | R    | T   |
|---------|---|------|-----|
| 9       | + | 0.36 | 6.7 |

TABLE V-continued

| Example | E | R | T   |
|---------|---|---|-----|
| 9A      | — | 0 | 7.6 |

EXAMPLES 10-12

Films are manufactured by extrusion-blowing of plastic coming from the die of an industrial extruder, marketed by the company WINDMOLLER & HOLSCHER and of 60 mm screw diameter, then cooling by the apparatus described above and shown in FIG. 2.

The characteristics of the die and of the cooling apparatus are as follows:

die of 160 mm diameter and gap width 0.8 mm;

cooling apparatus: height of lower chamber, 640 mm; height of upper chamber, 320 mm; angle of the air flow leaving the blowing ring being equal to A=75°; the opening of the blowing lip permitting passage of the air flow directed towards the tubing being equal to F=7 mm.

The material utilized is low density free radical polyethylene marketed under the trademark LOTRENE FB 3010 by the company CdF Chimie and having a melt flow index of 0.25 dg/min (measured according to ASTM D 1238-73) and a density of 0.922.

The operating conditions such as TG and R, and also the results obtained on the blown tubing of thickness e in microns, are reported in Table VI blow. The throughput is equal to 108 kg/h.

TABLE VI

| Example | TG  | R    | e  | E |
|---------|-----|------|----|---|
| 10      | 2   | 0.26 | 60 | + |
| 11      | 3.4 | 0.17 | 60 | + |
| 12      | 3.4 | 0.39 | 20 | + |

COMPARATIVE EXAMPLES 10A-12A

Films are manufactured by means of the same extruder and from the same material as those utilized in Examples 10-12, but this time using, to cool the tubing, an apparatus of the same type as that utilized in Examples 10-12 above but for which the openings situated at the bottom of the lower chamber have been closed in order to render this chamber closed.

The material throughput is likewise 108 kg/h. The operating conditions and also the results obtained are reproduced in Table VII below.

The extrudability E noted as (0) indicates that it is impossible to obtain blown tubing.

TABLE VII

| Example | TG  | R | e  | E |
|---------|-----|---|----|---|
| 10A     | 2   | 0 | —  | 0 |
| 11A     | 3.4 | 0 | 60 | — |
| 12A     | 3.4 | 0 | 20 | — |

EXAMPLES 13-15

The apparatus used is the same as that utilized for trials 10-12. The plastic material used is low density free radical polyethylene marketed under the trademark LOTRENE FB 5005 by the company CdF Chimie and having a melt flow index of 0.6 dg/min (measured according to ASTM D 1236-73) and a density of 0.921.

The operating conditions such as TG, R and also the results obtained on the blown tubing are reported in Table VIII blow. The throughput is equal to 102 kg/h.

TABLE VIII

| Example | TG  | R    | e  | E |
|---------|-----|------|----|---|
| 13      | 2   | 0.26 | 32 | + |
| 14      | 3.4 | 0.35 | 20 | + |
| 15      | 3.4 | 0.42 | 30 | + |

COMPARATIVE EXAMPLES 13A-15A

Blown tubing is manufactured from the same material as that utilized for trials 13-15, but this time utilizing the apparatus already used in Comparative Examples 10A-12A.

The operating conditions, and also the results obtained on the blown tubing, are reported in Table IX below.

The throughput is identical to that of Examples 13-15, i.e., 102 kg/h.

TABLE IX

| Example | TG  | R | e  | E |
|---------|-----|---|----|---|
| 13A     | 2   | 0 | 32 | — |
| 14A     | 3.4 | 0 | 20 | — |
| 15A     | 3.4 | 0 | —  | 0 |

EXAMPLES 16 AND 16A

Films are manufactured by extrusion-blowing from a mixture of resins furthermore constituted by 75% of linear polyethylene marketed under the trademark LOTREX FW 1290 by the company CdF Chimie and by 25% of free-radical polyethylene marketed under the trademark LOTRENE FB 3010 by the company CdF Chimie.

In Example 16, the apparatus used is that already utilized in Examples 10-15; and in Example 16A, the apparatus used is that already utilized in Examples 10A-15A.

The trials reproduced in Table X below were carried out at an expansion ratio TG=2 for a thickness of blown tubing equal to e=25 microns and for a throughput of material of 65 kg/h.

TABLE X

| Example | R    | E |
|---------|------|---|
| 16      | 0.32 | + |
| 16A     | 0    | — |

It will be apparent to those skilled in the art that various modifications and variations could be made in the method and apparatus of the invention without departing from the scope or spirit of the invention.

What is claimed is:

1. Apparatus for cooling a plastic film tubing issuing from an annular extrusion die comprising:
   non-closed lower chamber means including a wall positioned radially outward of the plastic film tubing and above the extrusion die for directing air flow past the tubing so that the tubing is moderately cooled and does not undergo appreciable dimensional modifications, the lower chamber means including an opening means for allowing influx of air flow into the lower chamber;
   an intensive blowing ring means positioned above the lower chamber means for directing air flow toward the tubing so that the tubing is intensely cooled; and
   upper chamber means positioned above the intensive blowing ring means for directing air flow along the tubing in the drawing direction of the tubing so that the tubing is further cooled.

2. Cooling apparatus according to claim 1, wherein said opening means of the non-closed lower chamber means is adjustable.

3. Cooling apparatus according to claim 2, wherein said opening means is adjustable by means of a system of perforated discs.

4. Cooling apparatus according to claim 1, wherein the height of said non-closed lower chamber means is adjustable.

5. Cooling apparatus according to claim 1, wherein the height of the upper chamber means is adjustable.

6. Cooling apparatus according to claim 1, further comprising means permitting modification of the throughput of the air flow directed, at the level of the upper chamber means, in the drawing direction of the tubing.

7. Cooling apparatus according to claim 1, wherein said intensive blowing ring means is constituted such that the angle A defined between the axis perpendicular to the tubing and the direction of the air flow leaving the ring means is between 0° and 85°.

8. Cooling apparatus according to claim 1, wherein the thickness F of the blowing lip of the intensive blowing ring means, constituted by the edges of an opening permitting passage of the air flow leaving the ring towards the tubing, is adjustable between 0.1 and 15 mm.

9. Cooling apparatus according to claim 1, said apparatus being disposed above said annular die, wherein the plastic tubing is radially expanded in the upper chamber means, further comprising an internal cooling system means for cooling the plastic tubing primarily subsequent to said radial expansion, comprising at least one air supply channel and at least one discharge channel for pulsed air passing axially through the annular die.

10. Cooling apparatus according to claim 8, said apparatus being disposed above said annular die, wherein the plastic tubing is radially expanded in the upper chamber means, further comprising an internal cooling system means for cooling the plastic tubing primarily subsequent to said radial expansion, comprising at least one air supply channel and at least one discharge channel for pulsed air passing axially through the annular die.

11. Cooling apparatus according to claim 9, characterized in that the internal cooling system is adjustable in height.

12. Cooling apparatus according to claim 10, characterized in that the internal cooling system is adjustable in height.

13. Cooling apparatus according to claim 11, wherein the adjustment of the internal cooling system is effected by means of at least one nestable element.

14. Cooling apparatus according to claim 13, wherein said nestable element comprises at least one airtight part and at least one part having openings.

15. Cooling apparatus according to claim 1 wherein the opening means is positioned at the lower part of the lower chamber means.

16. Cooling apparatus according to claim 1 wherein the wall of the non-closed lower chamber is positioned parallel to the tubing below the intensive blowing ring.

17. Process of extruding and cooling a plastic film tubing comprising:
extruding molten plastic material from an extrusion die to form a tubing;
moderately cooling the tubing by drawing it through a lower chamber positioned around the tubing above the extrusion die and directing air flow through the lower chamber so that the tubing does not undergo appreciable dimensional modifications;
intensely cooling the plastic material by directing air flow toward the tubing from a blowing ring positioned around the tubing above the lower chamber; and
further cooling the tubing by drawing it through an upper chamber positioned around the tubing above the blowing ring and directing air flow along the tubing in the drawing direction of the tubing.

18. Process according to claim 17 wherein the ratio of the throughput of air aspirated into the lower chamber to the throughput of air introduced into the intensive blowing ring is comprised between 0.1 and 0.5.

19. Process according to claim 17, wherein the plastic material is a resin chosen from the group consisting of polyethylenes, polypropylene, polybutene-1 and their mixtures.

20. Process according to claim 18, wherein the plastic material is a resin chosen from the group consisting of polyethylenes, polypropylene, polybutene-1 and their mixtures.

21. Process according to claim 19, wherein the melt flow index of said resin is between 0.1 and 10 dg/min.

22. Process according to claim 17, wherein the air directed from the blowing ring is directed through a lip constituting an opening which is adjustable between 0.1 and 15 mm.

* * * * *